(12) United States Patent     (10) Patent No.:     US 12,616,283 B2

McGee et al.                       (45) Date of Patent:          May 5, 2026

---

(54) MAGNETIC MODULAR SKI POLES

(71) Applicant: Hopturns Inc., San Francisco, CA (US)

(72) Inventors: Kelly B. McGee, San Francisco, CA (US); Cristina C. Ashbaugh, San Francisco, CA (US)

(73) Assignee: Hopturns Inc., San Francisco, CA (US)

( * ) Notice:   Subject to any disclaimer, the term of this patent is extended or adjusted under 35 U.S.C. 154(b) by 185 days.

(21) Appl. No.: 18/731,999

(22) Filed:   Jun. 3, 2024

(65)               Prior Publication Data

US 2025/0134223 A1      May 1, 2025

Related U.S. Application Data

(60) Provisional application No. 63/593,426, filed on Oct. 26, 2023.

(51) Int. Cl.
      *A63C 11/22*        (2006.01)
      *A45B 9/02*         (2006.01)
               (Continued)

(52) U.S. Cl.
      CPC .................. *A45B 9/02* (2013.01); *A45B 9/04* (2013.01); *A63C 11/221* (2013.01); *A63C 11/2224* (2020.08); *A63C 11/2228* (2020.08); *A63C 11/227* (2013.01); *A63C 11/228* (2013.01); *F16M 13/06* (2013.01); *F16M 13/08* (2013.01); *A45B 2009/002* (2013.01);
               (Continued)

(58) Field of Classification Search
      CPC ....... A45B 9/02; A45B 9/04; A45B 2009/002; A45B 2009/005; A45B 2009/007; A45B 2009/025; A45B 2200/05; A45B 2200/055; A63C 11/221; A63C 11/2224; A63C 11/2228; A63C 11/227; A63C 11/228; A63C 11/222; F16M 13/06; F16M 13/08
      USPC ...... 135/75–77; 280/809, 819–821, 823, 824
      See application file for complete search history.

(56)               References Cited

U.S. PATENT DOCUMENTS 2,347,789 A *  5/1944  Nichols ................ A63C 11/222
                                                  280/821
2,627,420 A *  2/1953  Wheeler ................ A63C 11/24
                                                  280/821
               (Continued)

FOREIGN PATENT DOCUMENTS

DE       2218731       10/1973
DE       9107084       9/1991
               (Continued)

OTHER PUBLICATIONS

International Search Report and Written Opinion dated Feb. 14, 2025 International Application No. PCT/US2024/049466.

*Primary Examiner* — Robert Canfield

(74) *Attorney, Agent, or Firm* — Beyer Law Group LLP

(57)               ABSTRACT

A variety of ski and hiking poles are described. In one aspect, magnets are provided on the pole handles and baskets to facilitate magnetic coupling a pair of poles together in a state suitable for carrying. In some embodiments, a pair of magnets are provided on each side of the handle. In some embodiments, a basket alignment piece is attached to the pole shaft. The alignment piece helps facilitate attachment of the basket to the pole shaft in an orientation that aligns the basket magnets relative to the handle magnets. In another aspect novel wrist straps are described.

34 Claims, 11 Drawing Sheets

(51) Int. Cl.
 *A45B 9/04*   (2006.01)
 *F16M 13/06*  (2006.01)
 *F16M 13/08*  (2006.01)
 *A45B 9/00*   (2006.01)

(52) U.S. Cl.
 CPC ... *A45B 2009/005* (2013.01); *A45B 2009/007* (2013.01); *A45B 2009/025* (2013.01); *A45B 2200/05* (2013.01); *A45B 2200/055* (2013.01)

(56)       References Cited

U.S. PATENT DOCUMENTS

| | | | | |
|---|---|---|---|---|
| 2,645,501 A | * | 7/1953 | Fawick | A63C 11/2224 280/821 |
| 3,085,814 A | * | 4/1963 | Scott | A63C 11/222 280/821 |
| 3,367,673 A | * | 2/1968 | Covini | A63C 11/222 280/821 |
| 3,378,272 A | * | 4/1968 | Lewis | A63C 11/222 403/41 |
| 3,378,273 A | * | 4/1968 | Lewis | A63C 11/222 403/328 |
| 3,427,039 A | * | 2/1969 | Collins | A63C 11/2224 280/821 |
| 3,443,820 A | * | 5/1969 | Baker | A63C 11/2224 135/65 |
| 3,525,532 A | * | 8/1970 | Baldsiefen | A63C 11/22 280/820 |
| 3,545,784 A | * | 12/1970 | Allsop | A63C 11/2224 280/821 |
| 3,582,100 A | * | 6/1971 | Allsop | A63C 11/2224 280/821 |
| 3,658,356 A | * | 4/1972 | Van Reyper | A63C 11/2224 24/627 |
| 3,662,433 A | * | 5/1972 | Couttet | A63C 11/2224 280/822 |
| 3,685,850 A | * | 8/1972 | Kepka | A63C 11/222 280/821 |
| 3,810,647 A | * | 5/1974 | Martchenke | F16M 13/00 396/420 |
| 3,825,276 A | * | 7/1974 | Adelmann | A63C 11/2224 280/821 |
| 3,866,931 A | | 2/1975 | Marker | |
| 4,057,261 A | * | 11/1977 | Koblick | A63C 11/24 280/821 |
| 4,082,302 A | * | 4/1978 | Albrecht | G04B 47/00 24/DIG. 54 |
| 4,129,312 A | * | 12/1978 | Loffelholz | A63C 11/24 280/813 |
| 4,130,293 A | * | 12/1978 | Hinterreiter | A63C 11/2224 280/822 |
| 4,229,015 A | * | 10/1980 | Ramsey | A63C 11/222 135/66 |
| 4,234,202 A | * | 11/1980 | Loffelholz | A63C 11/2228 280/820 |
| 5,303,954 A | * | 4/1994 | Suda | A63C 11/224 135/66 |
| 5,429,389 A | * | 7/1995 | Shandell | A63C 11/225 280/821 |
| 5,758,388 A | * | 6/1998 | Bjerke | A63C 11/2224 280/821 |
| 6,139,060 A | * | 10/2000 | Lenhart | A45B 9/02 280/821 |
| 6,264,242 B1 | * | 7/2001 | Lenhart | A63C 11/2224 280/821 |
| 6,386,588 B1 | * | 5/2002 | Young | A44B 11/12 280/821 |
| 6,561,206 B1 | * | 5/2003 | Wilkinson | A61H 3/0244 135/65 |
| 6,851,437 B1 | * | 2/2005 | Lenhart | A63C 11/2224 280/821 |
| 7,007,704 B2 | * | 3/2006 | Luckstead | A45B 7/00 135/65 |
| 7,992,583 B2 | * | 8/2011 | Lisenby | A61H 3/02 135/66 |
| 8,006,352 B2 | * | 8/2011 | Roiser | A63C 11/222 16/431 |
| D866,163 S | * | 11/2019 | Crown | D8/396 |
| 10,856,629 B1 | * | 12/2020 | Unice | A45B 1/00 |
| 11,026,486 B2 | * | 6/2021 | Böing | A45B 9/02 |
| 11,963,591 B2 | * | 4/2024 | Clifford-Brown | A45B 3/04 |
| 2002/0067036 A1 | * | 6/2002 | Young | A63C 11/2228 280/819 |
| 2003/0042726 A1 | * | 3/2003 | Wang | A45B 9/02 280/821 |
| 2004/0000785 A1 | * | 1/2004 | Land | A63C 11/2224 280/821 |
| 2004/0163693 A1 | * | 8/2004 | Uemura | A63C 11/2228 135/72 |
| 2008/0012286 A1 | * | 1/2008 | Lenhart | A63C 11/2224 24/265 R |
| 2012/0012625 A1 | * | 1/2012 | Foell | A63C 11/2228 224/267 |
| 2013/0328297 A1 | | 12/2013 | Lenhart et al. | |
| 2016/0377763 A1 | | 12/2016 | Christian et al. | |
| 2019/0134489 A1 | * | 5/2019 | Crowder | A63C 11/227 |
| 2021/0324997 A1 | * | 10/2021 | Ballentine | F16M 11/24 |

FOREIGN PATENT DOCUMENTS

| | | | | |
|---|---|---|---|---|
| DE | 102014100424 | | 7/2015 | |
| EP | 0044588 | | 1/1982 | |
| EP | 3318309 | | 3/2020 | |
| KR | 20-0314268 | | 5/2003 | |
| SE | 523118 | | 3/2004 | |
| WO | WO-0176702 A1 | * | 10/2001 | A63C 11/2228 |
| WO | WO-2019094054 A1 | * | 5/2019 | A45B 9/02 |
| WO | WO-2022200370 A1 | * | 9/2022 | A45B 9/02 |

* cited by examiner

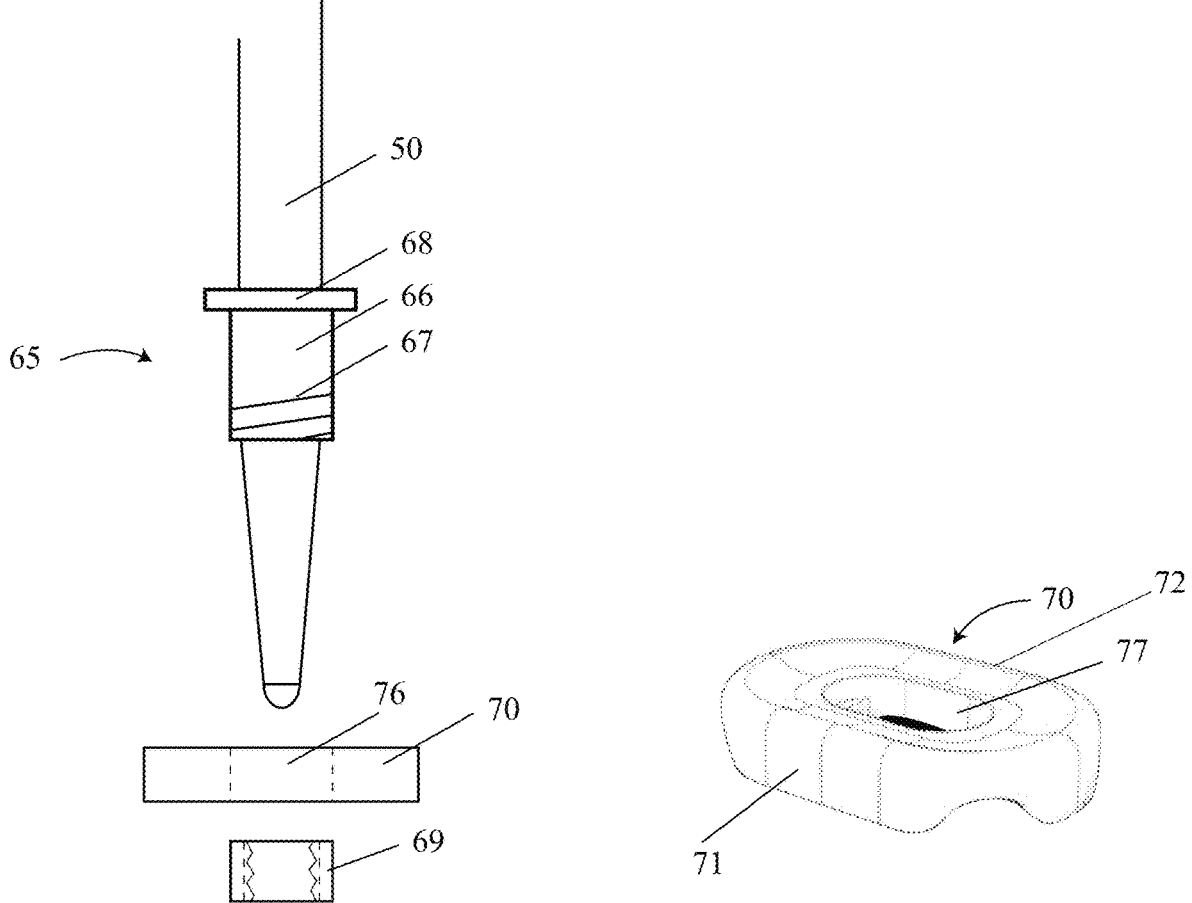
Figure 4                    Figure 5

MAGNETIC MODULAR SKI POLES

CROSS REFERENCE TO RELATED APPLICATIONS

This application claims priority of Provisional Application No. 63/593,426, filed Oct. 26, 2023, which is incorporated herein by reference.

BACKGROUND

The present invention relates generally to ski poles, hiking poles and the like.

Ski poles are used in the sport of skiing for a variety of purposes, including balance, propulsion, stability, and more. Similar poles are used in other outdoor sports, such as hiking. Poles today are offered in a variety of sizes and types, which vary based on material used (e.g., aluminum, carbon fiber, or other composite materials) and key features (telescoping, ultralightweight, high strength, sustainable materials, grip ergonomics, etc.)

While ski poles have been used for decades and the key features and materials above have been iterated upon, there are still some core issues that have not been properly addressed. These include:

1. The inability of poles to be neatly connected together to be carried more easily.
2. The difficulty of being able to insert a gloved hand into the straps, often due to the opening not being large enough or staying open.
3. The lack of easy modularity to provide users the ability to uniquely configure their poles as desired cosmetically or to adapt to different technical requirements of their skiing or environment.
4. The difficulty of repairing poles after being bent or broken, as they often require a complete replacement of the product.
5 The inability to easily attach video recording devices to capture videography while skiing.
6 The difficulty of collapsing a pole to a smaller size to be more easily transported.

Although existing ski poles work well, improved ski pole designs that help address some or all of the issues described above are desirable.

SUMMARY

A variety of ski and hiking poles are described. In one aspect, a ski or hiking pole includes a handle having a grip region and at least one handle magnet. A pole shaft is directly or indirectly coupled to or carried by the handle at a first end of the pole shaft. A basket is coupled to or carried by the pole shaft near a second end of the shaft. The basket includes at least one basket magnet. A first handle magnet and a first basket magnet are positioned to facilitate magnetic coupling with complementary handle and basket magnets on a second ski or hiking pole to connect the poles together in a state suitable for carrying.

In some embodiments, a second handle magnet is provided at a location on the handle that is longitudinally spaced apart from the first handle magnet. The first and second handle magnets are positioned suitably for magnetically interacting with complementary handle magnets on the second pole to provide two spaced apart magnetic couplings on the handle when the poles are connected together in the carrying state.

In some embodiments, magnets are provided on both sides of the handle and both sides of the basket such that the second pole can be magnetically attached to the first pole on either side of the first pole.

In some embodiments, two (or more) basket magnets are provided on each side of the basket. This facilitates multiple magnetic couplings on the basket when the poles are held together in the carrying state. In some embodiments, the basket has a substantially ovular or racetrack shape having a pair of substantially parallel sides. In such embodiments, the basket magnets may be positioned along the straight and parallel side surfaces of the basket.

In some embodiments, the handle has a substantially flat handle contact surface adjacent to the first handle magnet and the basket has a substantially flat basket contact surface adjacent to the first basket magnet. The handle contact surface and the basket contact surface are substantially co-planar and arranged such that when the poles are in the carrying state, the handle and basket contact surfaces engage complementary flat handle and basket contact surfaces on the second pole.

In some embodiments, a basket alignment piece is attached to the pole shaft. The alignment piece helps facilitate attachment of the basket to the pole shaft in an orientation that aligns the basket magnets relative to the handle magnets. In some embodiments, the handle has a first handle contact surface adjacent the first handle magnet; the basket has a first basket contact surface adjacent the first basket magnet; and the alignment piece is configured to help ensure that the first handle contact surface is substantially coplanar with the first basket contact surface when the basket is installed on the pole shaft.

In some embodiments, the alignment piece is shaped so that the basket can only be secured to the alignment piece in an orientation in which the handle and basket contact surfaces are aligned. In some embodiments, the alignment piece includes a flange that sets a vertical position of the basket relative to the pole shaft. The alignment piece also includes a shank having an exterior thread configured to engage a nut that secures the basket to the alignment piece.

In some embodiments, the magnets are rare earth magnets such as neodymium magnets. In some embodiments, the handle magnet(s) is/are sealed inside of the handle. In some embodiments, the handle includes a handle core, and a top cap is ultrasonically or high frequency welded to a top end of the handle core to seal the upper handle magnets inside the handle. In some embodiments, a bottom cap may be similarly welded to a bottom end of the handle core to seal the lower handle magnets inside of the handle. In some embodiments, the basket magnets are sealed in a similar manner.

In some embodiments, the handle further includes an accessory mount receiver exposed on a top end of the handle. The accessory mount receiver may be molded into the into the handle. The accessory mount receiver can be used to mount a camera or other accessory items on the pole.

In some embodiments, the handle has a handle pole segment that is permanently attached to the handle. In some embodiments, a main pole shaft is detachably attached to the handle pole segment.

In some embodiments, a wrist strap is provided. The wrist strap includes an anchor. The handle includes a strap receiver configured to receive the strap anchor to facilitate detachable attachment of the wrist strap to the handle.

In some embodiments, a non-magnetic metallic pole tip is attached to the distal end of the pole shaft.

In another aspect a ski or hiking pole includes a handle, a wrist strap, a pole shaft and optionally a basket. The wrist strap includes a strap anchor having a preformed fastener receiving hole. A strap fastener is inserted through a strap fastener recess in the handle and the fastener receiving hole in the wrist strap anchor. The strap fastener is detachably coupled to the strap fastener receiver embedded in the handle (e.g., via a threaded engagement) to attach the wrist strap to the handle. With this arrangement, the wrist strap may be replaced by removing the fastener, withdrawing the strap anchor from the strap fastener recess, inserting a second strap anchor of a second wrist strap into the strap fastener recess such that the fastener receiving hole of the second wrist strap aligns with the strap fastener recess, inserting the fastener through the strap fastener recess and the fastener receiving hole of the second wrist strap, and securing the fastener to the strap fastener receiver.

The strap fastener receiver may take a variety of forms, as for example a threaded nut. Preferably the strap fastener receiver is formed from a non-magnetic metal such as stainless steel.

In some embodiments, the strap anchor is formed from a rigid plastic material. In some embodiments, the strap anchor is molded onto a fabric strap.

In some embodiments, the handle includes a plastic core and a plastic overcoat that is overmolded over at least a portion of the plastic core. The overcoat is formed from a softer plastic material than the plastic core and forms at least a portion of the grip region of the handle. In some embodiments, the strap fastener receiver is exposed on an exterior surface of a plastic handle core but is covered by the overcoat such that the strap fastener receiver is not exposed on an exterior surface of the handle.

BRIEF DESCRIPTION OF THE DRAWINGS

The invention and the advantages thereof, may best be understood by reference to the following description taken in conjunction with the accompanying drawings in which:

FIG. 4 is a diagrammatic exploded view of the tip region of a pole highlighting the basket region.

FIG. 5 is a diagrammatic perspective view of a basket in accordance with an embodiment.

In the drawings, like reference numerals are sometimes used to designate like structural elements. It should be appreciated that the depictions in the figures are diagrammatic and not to scale.

DETAILED DESCRIPTION

Figure 1:
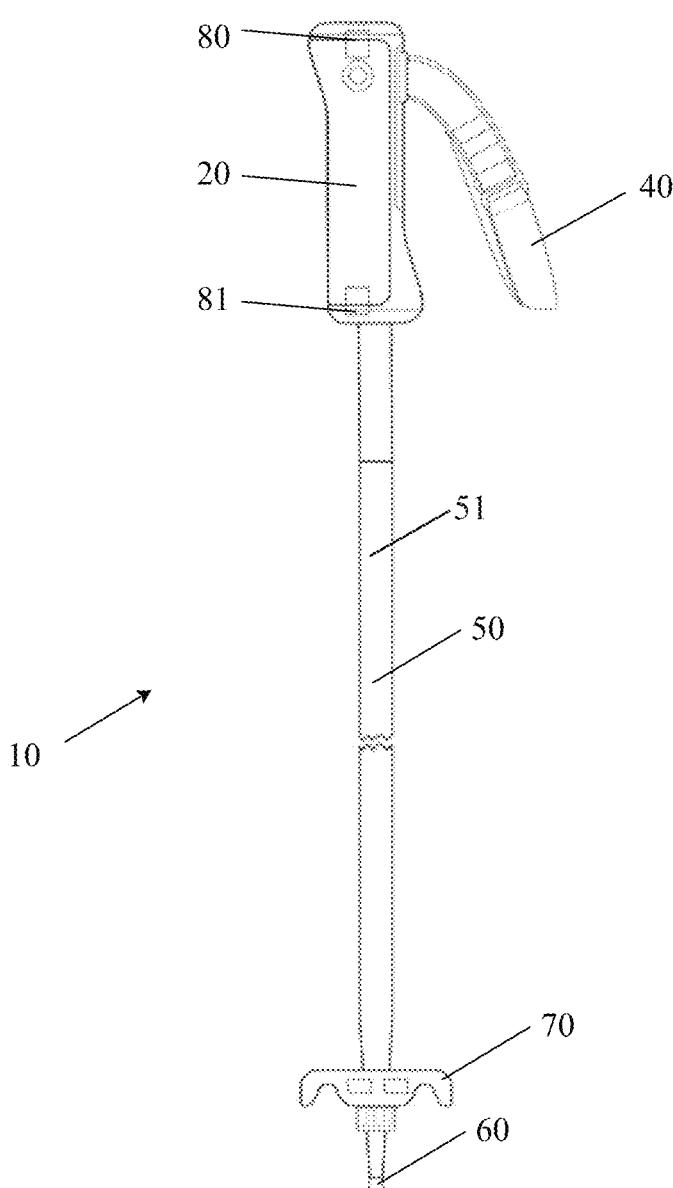
FIG. 1 is a diagrammatic left side view of a ski pole in accordance with an embodiment.
Figure 2:
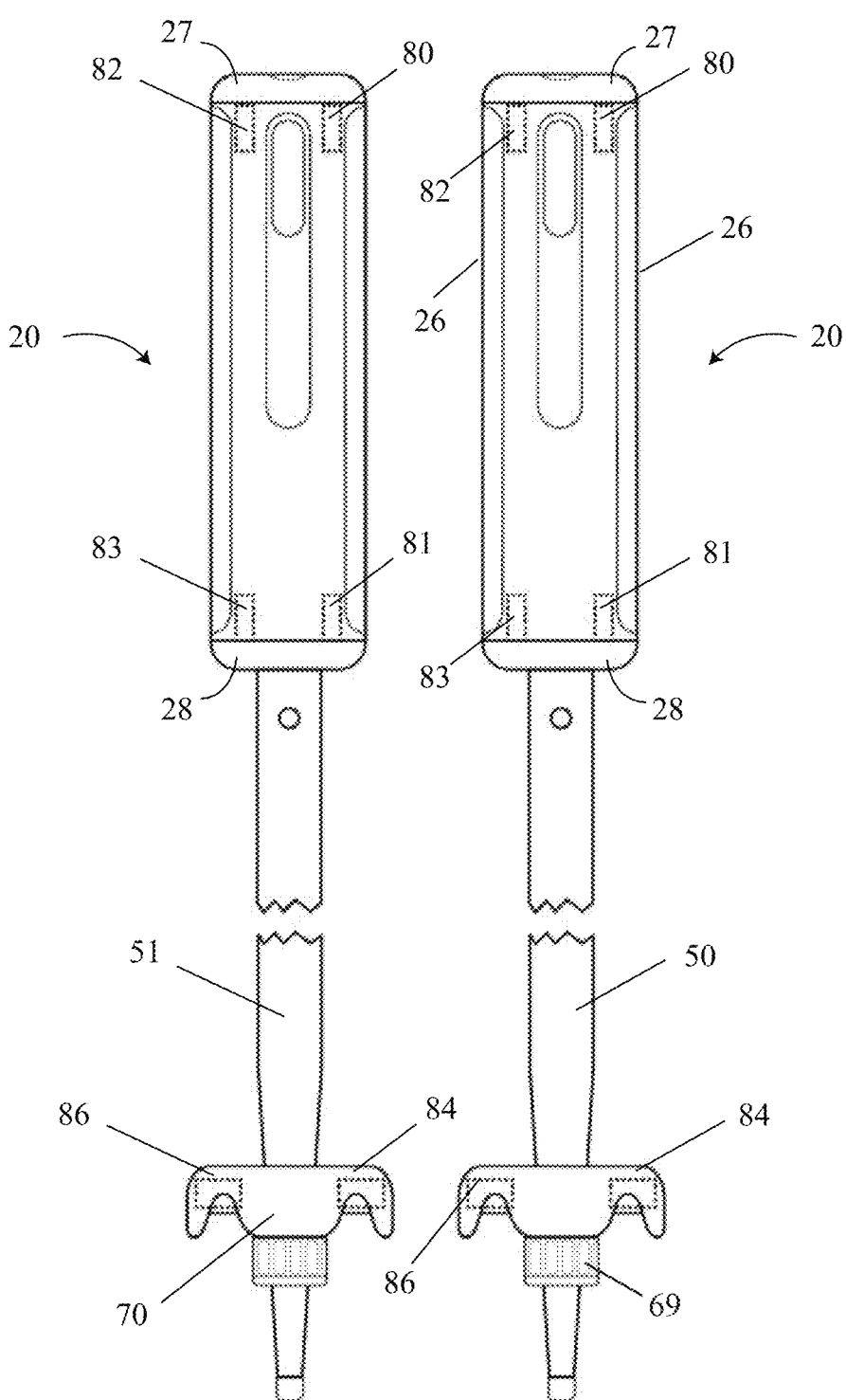
FIG. 2 is a diagrammatic representation of a pair of ski poles illustrating representative magnet placement and coupling in accordance with an embodiment.

Referring initially to FIG. 1, a ski pole 10 in accordance with a first embodiment includes a handle 20, a wrist strap 40, a pole shaft 50, a pole tip 60 and a basket 70. Two such poles provide a pair of ski poles. Magnets 80-87 are added to the handles and baskets of the ski poles such that a pair of poles can readily be held in place together side-by-side by magnetic force as seen in FIG. 2. With this arrangement, a pair of poles can easily be carried in one hand by grasping a single one, or both of the poles. To facilitate this, the combined strength of the magnets used for attachment are greater than the weight of one pole so that when held horizontally by just one pole, the other does not separate.

In the embodiment illustrated in FIG. 2, the handle includes 4 magnets 80-83 and the basket 70 includes 4 magnets 84-87. In other embodiments more or fewer magnets may be provided in either the handles or the baskets. In the illustrated embodiment, a first pair of magnets 80, 82 are provided on opposite sides (right/left) of the upper end of each handle and a second pair of magnets 81, 83 are provided on opposite sides (right/left) of the lower end of each handle. A pair of magnets are also provided on each side of the basket. In the illustrated embodiment, magnets 84 and 85 are provided on the left side of the basket and magnets 86 and 87 are provided on the right side of the basket.

Figure 3:
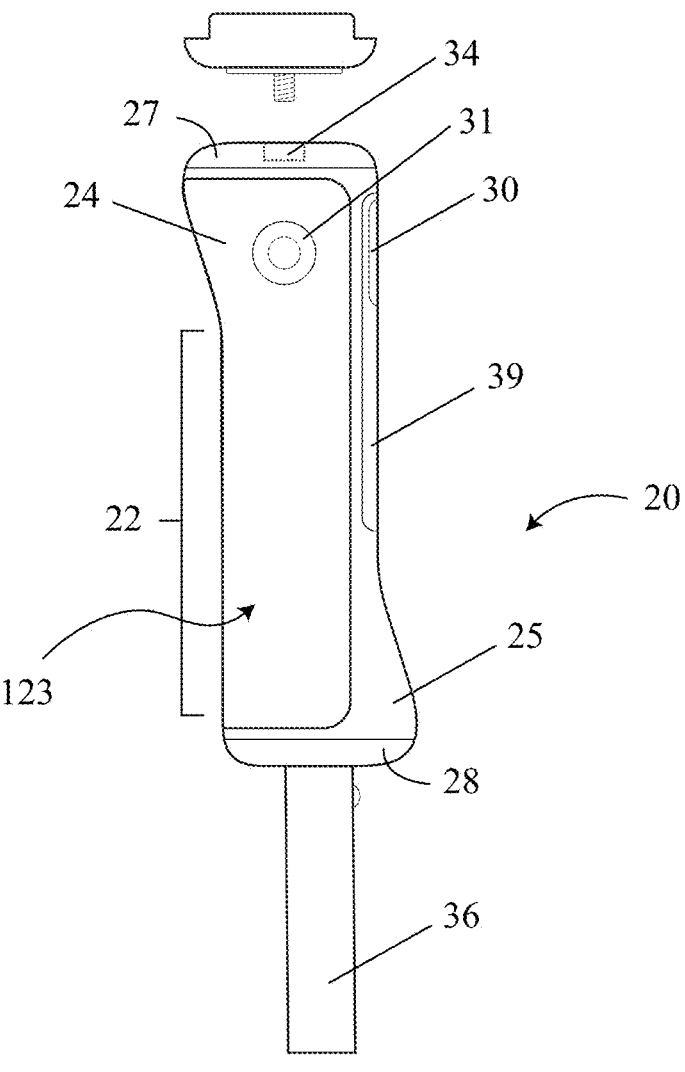
FIG. 3 is a left side view of a handle in accordance with one embodiment.
Figure 6:
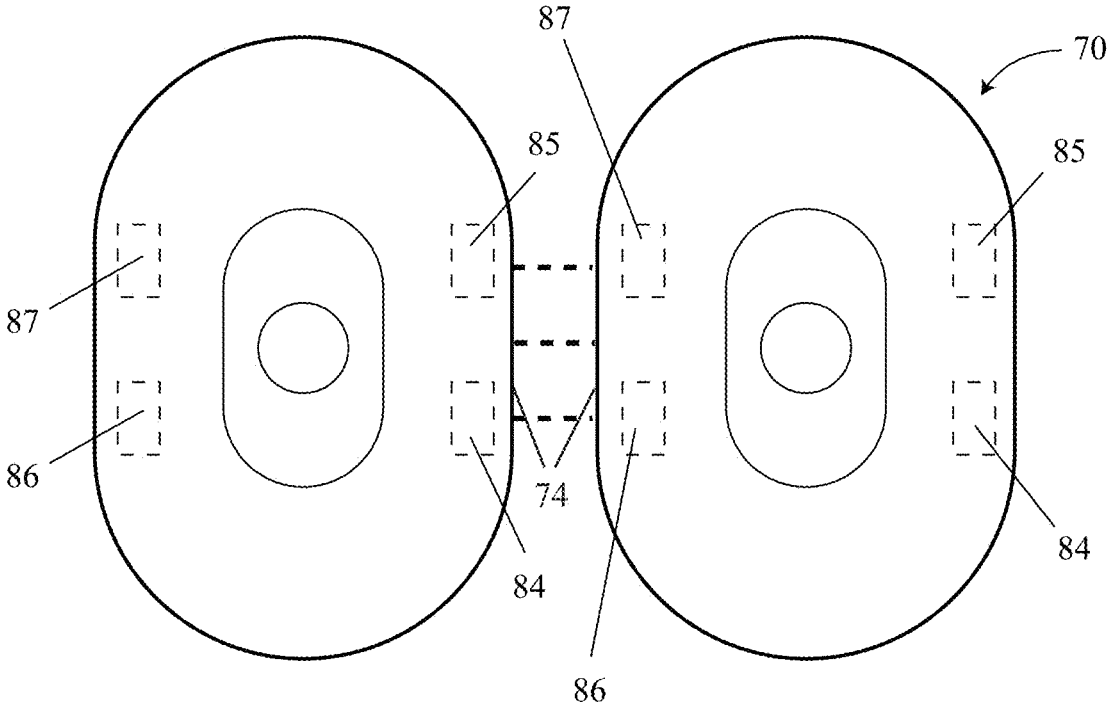
FIG. 6 is a diagrammatic top view of a pair of baskets illustrating representative magnet placement and coupling.

In the embodiment illustrated in FIG. 3, the handle 20 includes a grip region 22 between enlarged boss regions 24 and 25, a strap anchor recess 30, a strap fastener recess 31, a threaded strap fastener receiver (not seen) in the strap fastener recess 31, an accessory attachment receiver 34, pole shaft receiving bore 35, and a pole shaft segment 36. In some embodiments, an optional engraving plaque 39 is also included. During use, a user will frequently grasp the handle in the grip region 22 between the upper and lower boss regions 24, 25. In some embodiments, the handle magnets are positioned within the bosses 24, 25 and are therefore outside of the grip region 22. An advantage of this arrangement is that the circumference of the grip region can generally be reduced more when it doesn't contain magnets, thereby facilitating smaller circumference and more ergonomic grips. Also, it can help reduce the possibility of ferrous jewelry inadvertently interacting with the magnets during use. In other embodiments, some or all of the handle magnets may extend into the grip region. Alternately, in some embodiments, a single elongated magnet is provided on each side of the handle.

In the illustrated and primary described embodiments, magnets are provided on each side of the handle (e.g., magnets 82, 83 on the left side and magnets 80, 81 on the right). Generally, this is preferred so that a second pole can be magnetically coupled on either side a first pole. That is, a second pole may be attached to either the right or left side of the first pole. This simplifies coupling the poles together from the user's standpoint since there is no need to think of the relative left/right placement of the poles for coupling. It also facilitates stacking more than two poles together. For example, two or more pairs of similar length poles can readily be coupled in an array if/when desired.

In the illustrated embodiment, a pair of vertically spaced apart magnets are provided on each side of the handle, (e.g., an upper magnet above the grip region and a lower magnet below the grip region). An advantage of the vertical spacing of magnets on one side of the handle is that such spacing can help align the poles parallel to one another when attaching the poles. It also mitigates the risk of the poles rotating relative to one another and/or attaching in a rotated (non-parallel) orientation. In other embodiments, additional vertically spaced magnets and/or longer magnets that extend under the grip region can be provided to strengthen the magnetic attraction and/or help mitigate the risk of pole non-alignment or rotation.

The polarity of the sides of the top magnets 80, 82 facing their associated handle contact surfaces are preferably opposite, as are the polarity of the respective bottom magnets 81, 83. This allows the poles to be used interchangeably with other similar magnetic poles without requiring replacement poles to have a specified polarity. In some embodiments, the polarity of the sides of the handle magnets 80, 81 facing the right-side contact regions are the same while the polarity of the sides of the handle magnets 82, 83 facing the left-side contact regions are the same and opposite to those of the right side of the handle. In other embodiments, upper and lower handle magnets on each side may have opposite polarities. In some embodiments, the pair of top handle magnets 80, 82 can be replaced by a single elongated magnet having opposite polarities on its opposite ends and the same can be done for the lower pair of handle magnets 81, 83. However separate magnets are typically more cost effective.

The handle magnets 80-83 are preferably sealed inside the handle 20 so they are not exposed to moisture. Similarly, the basket magnets 84, 86 are sealed inside the basket 70. This is desirable because moisture can degrade the magnet over time.

Figure 12:
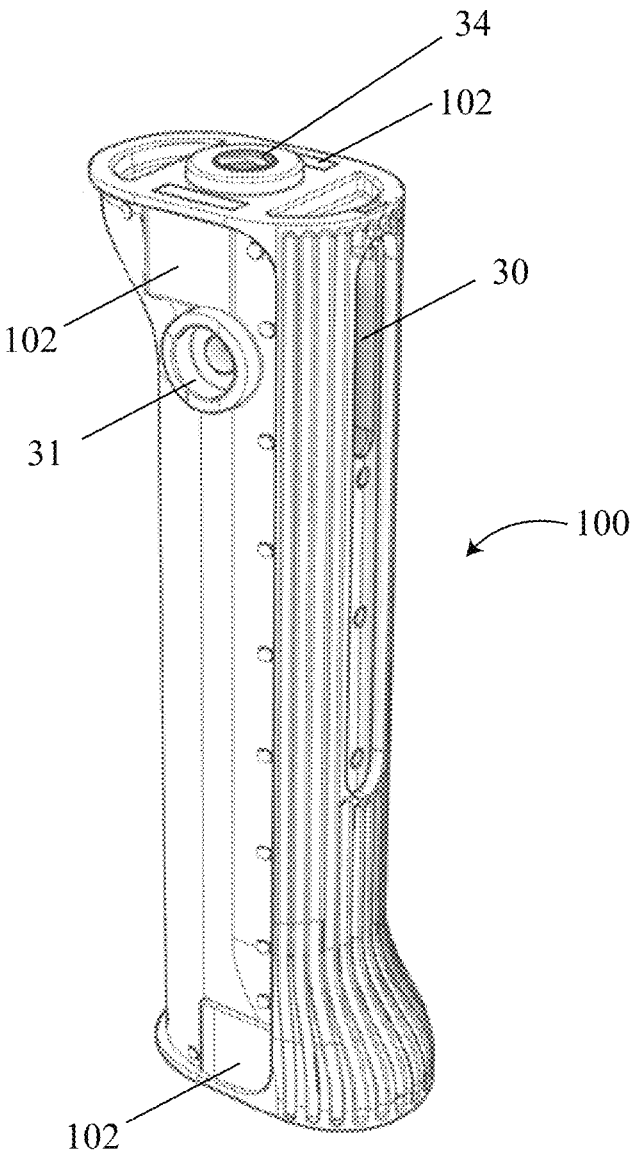
FIG. 12 is a diagrammatic side view of a plastic handle core suitable for use in the handle of FIG. 8.

When the handle 20 and the baskets 70 are formed from a plastic material or other moldable materials, the sealing can be accomplished by molding the handle around the magnets. However, a drawback of molding plastics around the magnets is that the heat/temperatures used in typical molding processes (e.g., of injection or transfer molding) may reduce the strength of the magnets. To overcome this issue, a handle core may be molded from a plastic material with pockets or recesses sized to receive the magnets. A representative handle core 100 is illustrated in FIG. 12. The handle core 100 includes four magnet pockets/recesses 102, with each of the magnet pockets 102 being sized to receive a corresponding one of the handle magnets 80-83.

In the illustrated embodiment, the handle core also includes the strap anchor recess 30, the strap fastener recess 31 and the accessory attachment receiver 34. A plastic overcoat 123 (FIGS. 3, 8) is overmolded over at least portions of the handle core 100 such that it covers a bottom end of a strap fastener receiver (not shown) and lateral portions of the magnet recesses (thereby forming the pockets 102), but does not cover the strap fastener recess 31, the anchor slot 30, or the pole shaft receiving bore 35. Typically, the overcoat 123 is formed from a softer plastic than the handle core 100 and covers at least a large portion of the grip region 22. The overcoat thus provides a more comfortable grip for the user.

After the core has been molded (and any overcoat applied thereto), the magnets may be inserted into the recesses. Top and top and bottom caps 27, 28 are then ultrasonically or high frequency welded to the handle core to encase/seal the magnets in their pockets. The ultrasonic/high frequency welding process allows for a strong bond to be made between each cap and the handle core uniting the two pieces but does not degrade the strength of the adjacent magnets. In other embodiments, the magnets can be sealed using other waterproof sealing methods, such as caps or coverings with common seals such as "O-rings."

FIG. 12 illustrates a representative handle core 100. The handle core 100 includes the strap anchor recess 20, the strap fastener recess 31 and the accessory attachment receiver 34.

In the illustrated embodiment, substantially planar contact surfaces are provided on the exterior of the handle and basket adjacent each magnet to facilitate good magnetic attachment between adjacent poles when the poles are magnetically coupled together. In some embodiments, the handle contact surfaces 26 and the basket contact surfaces 74 are aligned and the width of the handle between the handle contact surfaces 26 and the width of the basket between the basket contact surfaces 74 are the same, resulting in the handle contact surfaces being substantially coplanar with the basket contact surfaces so that the pole shafts extend parallel to one another when joined together. In some such embodiments, no part of the handle or the baskets have a width that exceeds the width between the handle contact surfaces 26.

In other embodiments, such as the embodiment shown in FIG. 2, the width of the baskets is wider than the width of the handles. This is often desirable on ski poles in particular so that the baskets have more surface area. That results in the pole shafts not being strictly parallel when they are magnetically coupled together. When the width of the handle is the same adjacent the top and bottom magnets, this results in the portions of the handles adjacent the lower magnets not actually touching one another when the poles are magnetically coupled. However, good magnetic coupling is still readily achieved even with the resulting small air gap between the handles in that region.

In some embodiments, each side of the handle has an elongated substantially planar side surface that extends from adjacent the corresponding upper handle magnet to adjacent the corresponding lower handle magnet, thereby acting as an elongated handle contact surface 26. In other embodiments, the handle contact regions may be raised relative to other portions of the handle (e.g., the handle may be narrower in the grip region 22). Regardless of the approach, the geometry of the handle and baskets are preferably such that when a pair of poles are placed adjacent one another for magnetic coupling, their respective contact surfaces 26, 74 abut one another to facilitate good magnetic coupling.

In some embodiments, the width of the basket 70 is substantially the same as the width between the handle contact surfaces 26. This allows the pole shafts to extend substantially parallel one another when a pair of poles are magnetically coupled together. However, in other embodiments, the relative width of the baskets may vary. In embodiments where the handle and baskets have the same width, the handle contact surfaces 26 and the basket contact surfaces 74 may be coplanar or substantially coplanar.

When the contact surfaces 26 on opposite sides of the handle are parallel and the width of the basket matches the width of the handle, the pole shafts extend in parallel when the poles are magnetically coupled. In embodiments where the baskets 70 are wider than the handles, there may be a small air gap between the lower bosses 25 of the handle when the poles are magnetically coupled. That works fine due to the nature of the magnetic coupling. In other embodiments, the width of the boss regions 25 housing the lower magnets may optionally be slightly wider than the width of the boss regions 24 housing the upper magnets to at least partially compensate for the angled attachment. Also, and of the contact surfaces of the handle or basket may be slightly angled to more closely match the angle at which the poles align when coupled. However, given the nature of the magnetic coupling, such alignment is not required.

In the embodiment illustrated in FIG. 5, the baskets 70 have an ovular "racetrack" shape with a pair of parallel sides 71, 72. The surface area of the basket can be large or small, however the two parallel sides are preferably long enough that the required magnets can be positioned adjacent to those sides.

In the embodiment of FIG. 5 two basket magnets 84, 85 are positioned side-by-side-along the left side 71 of the basket and two basket magnets 86, 87 are positioned side-by-side along the right side 72. The side-by-side placement is dictated in large part by the fact that the baskets are thin, so there typically isn't room to stack magnets vertically. In other embodiments, a single basket magnet is provided on each side of the basket. In still other embodiments, more than two magnets, may be placed provided on each side. The baskets are typically molded from a plastic material and as described above. The structures used to hold the basket magnets in place may vary widely. In some embodiments, the magnets are placed in pockets formed on the bottom side of the basket and a bottom cover is screwed onto a central region of the bottom of the basket to hold the magnets in place. In some embodiments the magnets are sealed within the baskets so that they are not exposed to moisture during use.

The overall bottom surface area of the baskets may vary based on their intended uses. Baskets intended for powder skiing generally have more bottom surface area (e.g., being longer and/or wider) than baskets intended for use skiing on more compact surfaces. Baskets intended for hiking on bare ground tend to have even less surface area and can therefore have shorter side surfaces.

Although oval/racetrack basket geometries are shown, it should be appreciated that in other embodiments, other basket geometries may be used that accomplish similar functions. For example, rather than having a pair of parallel side surfaces that serve as contact surfaces 74, the engaging surfaces may be more wavelike or serrated in complementary manners thereby providing basket features that extend further radially while maintaining the same coupling distance between the poles as provided by the handles. In such arrangements complementary substantially flat contact surfaces can still be provided on the baskets, even though they may not be aligned with the handle contact surfaces.

Regardless of the geometry of the baskets, it is important that the baskets align appropriately with the handle so that both the handle magnets and the basket magnets couple when the poles are placed together. For example, in the embodiment of FIG. 2, the handle contact surfaces 26, are generally aligned with the side edges 71, 72 of the basket (which form the basket contact surfaces 74). A center alignment piece 65 is used to align the basket in order to ensure its magnetic surfaces are substantially aligned with the flat surfaces of the handle.

Figure 7:
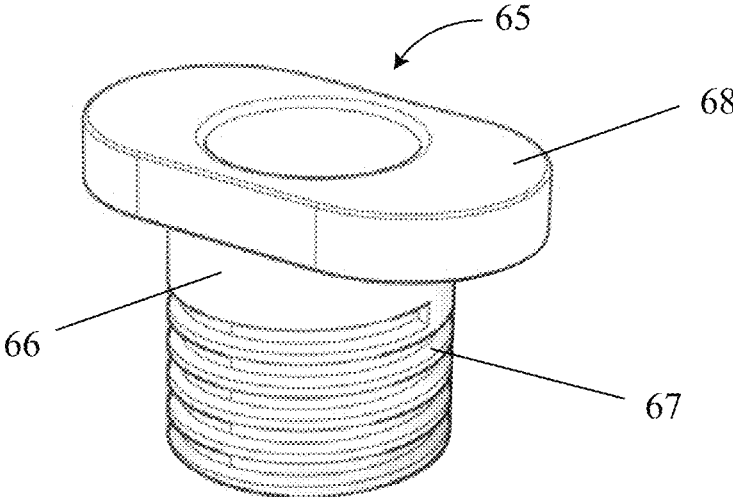
FIG. 7 is a perspective view of an alignment piece in accordance with an embodiment.

In the embodiment of FIGS. 4 & 7, the alignment piece 65 has a tubular shank 66 with an exterior thread 67 and an upper flange 68. The alignment piece 65 is secured to pole shaft 50. In some embodiments, the attachment of the alignment piece is accomplished by press fitting and adhesively attaching the alignment piece to the pole shaft using a suitable adhesive such as epoxy.

The upper flange 68 of alignment piece 65 serves as a register that dictates the vertical position of the basket 70 on the pole shaft 50. The upper flange 68 also has a non-circular geometry that serves as an angular alignment feature for the basket. That is, it ensures that the side edges 71 and 72 of the basket will align with the handle contact surface 26 when the basket is installed on the pole shaft 50. In the illustrated embodiment, the upper flange has a substantially oval/racetrack geometry when viewed from the top, although other geometries may be used in other embodiments to accomplish the alignment function. By way of example diamond shaped work well.

The basket 70 has a center hole 76 and an ovular recess 77. The center hole 76 is sized to closely slide over the alignment piece shank 66. The recess 77 is sized and shaped to closely receive the alignment piece flange 68. To install the basket 70 on the pole shaft, the basket is inserted over the distal end of the pole shaft 50 and over the alignment piece 65. The registration of the lower surface of flange 68 against the floor of recess 77 sets the vertical position of the basket 70. The complementary oval geometries of the recess 77 and flange 68 dictate that the basket must be installed in one of two orientations, both of which result in the side edges 71 and 72 of the basket being aligned with the handle contact surfaces 26. In other embodiments, the complementary geometries of the flange 68 and recess 77 may be varied so that the basket can only be attached in one orientation. After the basket has been positioned, a nut 69 may be screwed onto the alignment piece exterior thread 67 to firmly hold the basket in place. It should be appreciated that this arrangement facilitates simple replacement of the baskets 70 should a user desire to utilize different magnetic baskets, while still retaining the ability to magnetically couple the poles together.

As mentioned above, in the illustrated embodiment, two magnets are provided along each contact surface 74 of the basket. In some embodiments, the adjacent magnets 84 and 85 on a first side of the basket have opposite polarities, as do the adjacent magnets 86, 87 on the opposite (second) side of the basket, with diagonal magnets 84 and 87 having a first polarity and the diagonal magnets 85 and 86 having the opposite polarity. This allows the basket to be attached to be secured to the alignment piece in either of the two orientations made possible by the illustrated flange 68 and recess 77.

The described alignment piece ensures that the planar design intent is reached when the basket 70 is installed onto the alignment piece 65—preferably within 10% of rotational accuracy and more preferably within 5% rotational accuracy. In other embodiments, the desired alignment can be accomplished in other manners. For example, a protruding piece of the pole shaft may be provided that locks into a corresponding notch in the basket. In other embodiments, the center basket hole 76 and the complementary geometry for the alignment piece shank can be non-circular, such as oval or diamond shaped, which ensures the basket is oriented correctly when assembled.

Accessory Mount

Figure 11:
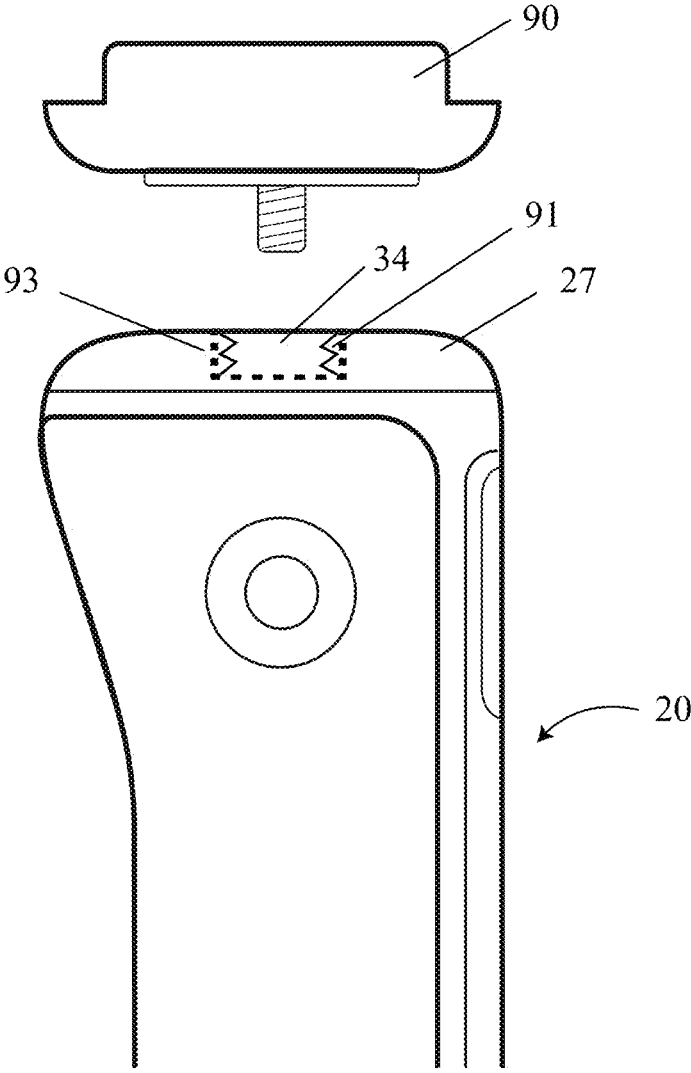
FIG. 11 is an exploded diagrammatic side view of the top region of a handle and showing an accessory mount.

In some embodiments, the handle 20 includes an accessory mount receiver suitable for receiving an accessory mount. One such embodiment is illustrated in FIGS. 3 and 11. In the illustrated embodiment, an accessory attachment receiver 34 is provided on the top surface of the handle. The accessory attachment receiver serves as a base to which accessories or accessory mounts can be attached to the ski pole. In the illustrated embodiment, the accessory attachment receiver includes a threaded bore 91 that accessories, or accessory mounts may be screwed into. For example, a camera mount 90 (e.g., a GoPro mount, a Smartphone mount, etc.) may be threadably secured to the top of the ski pole. A camera (e.g., a GoPro, a Smartphone, etc.—not shown) can then be secured to the mount. With this arrangement, the skier can take videos while skiing while still holding their poles. When stopped, the pole can effectively serve as a monopod if/when desired. Of course, in other circumstances, other devices/accessories can be secured to a mount and/or suitably equipped cameras and other accessories can be attached directly to the accessory attachment receiver 34.

The accessory attachment receiver may be formed in a variety of ways. In some embodiments, a nut is molded into the handle core (e.g., handle core 100 shown in FIG. 12) so that it is exposed at the top end of handle core when the handle core is first formed. The top cap 27 has a central opening 93 that is positioned over the nut when the top cap is ultrasonically welded to the top surface of the handle core so at least a threaded bore of the nut is exposed, thereby forming the accessory attachment receiver 34.

Wrist Strap

Figure 8:
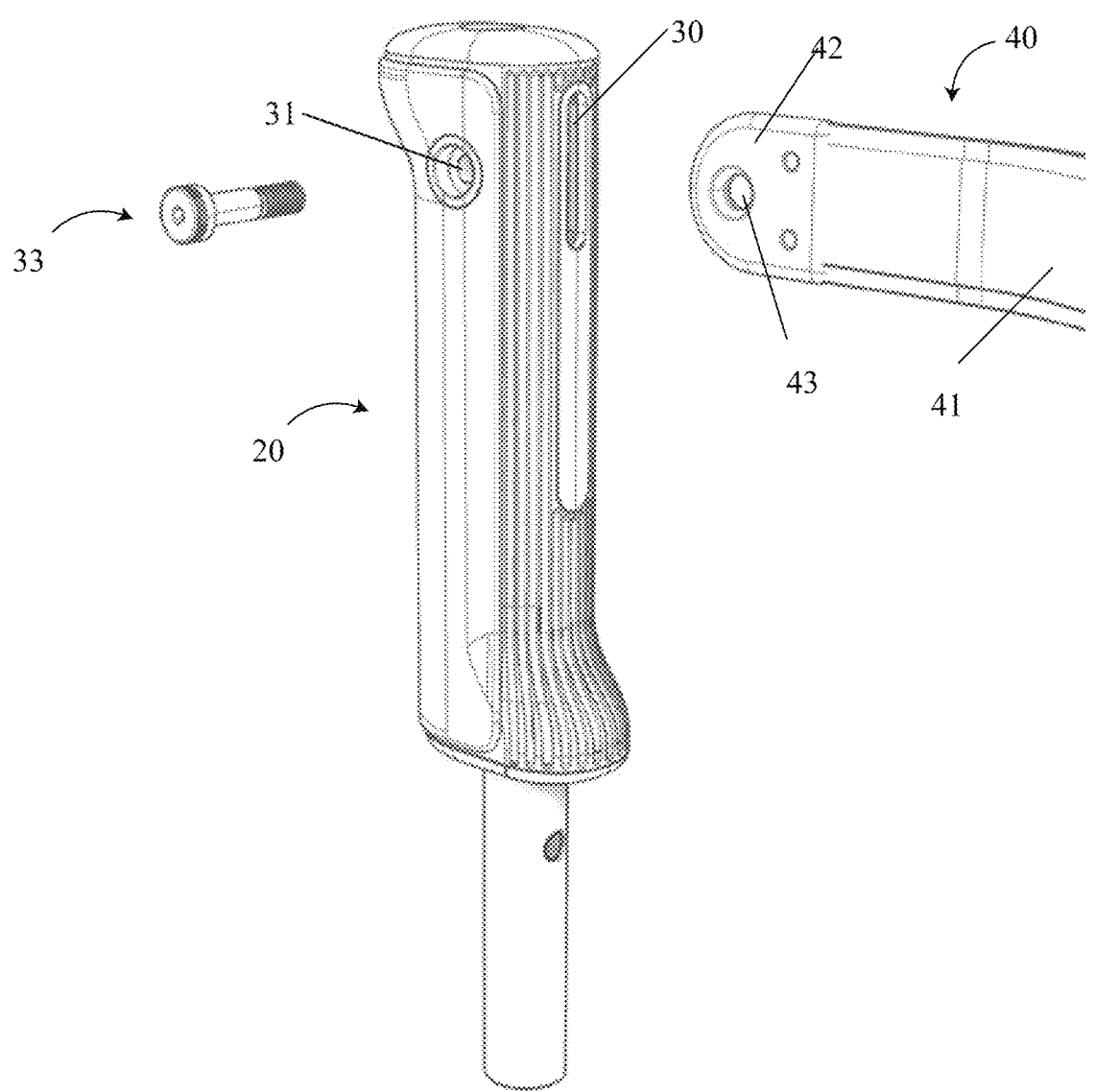
FIG. 8 is a diagrammatic view of a wrist strap and handle region highlighting the use of a strap anchor to couple the strap to the handle.
Figure 9:
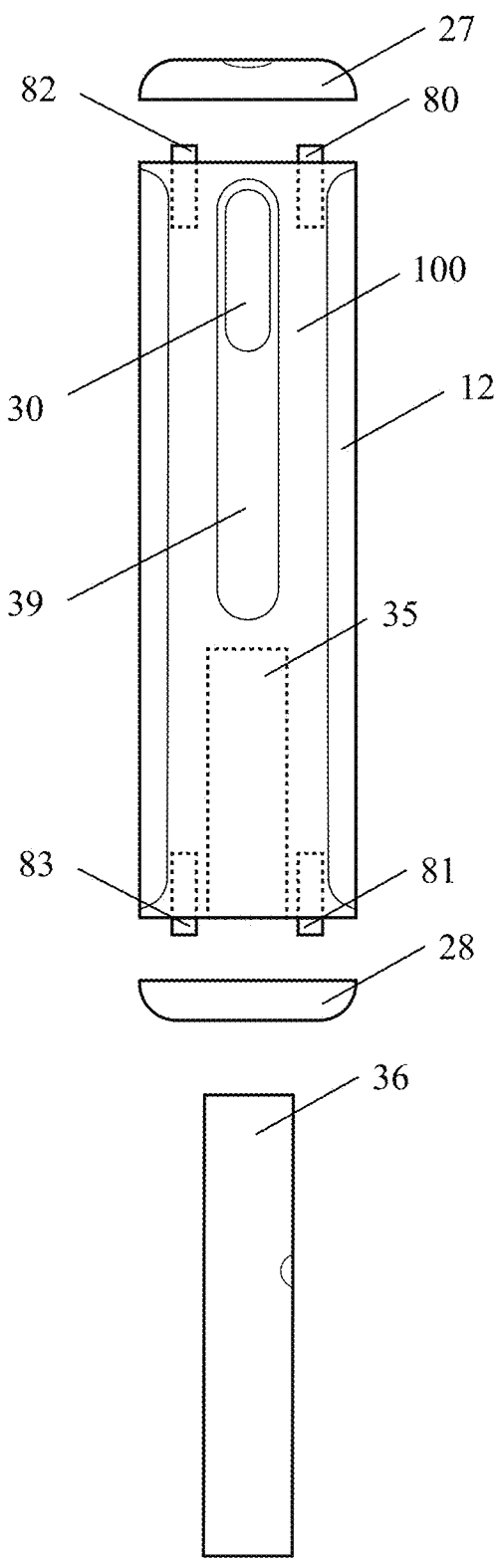
FIG. 9 is a diagrammatic exploded cross-sectional view of a ski pole handle in accordance with another embodiment illustrating selected components of the handle.
Figure 10:
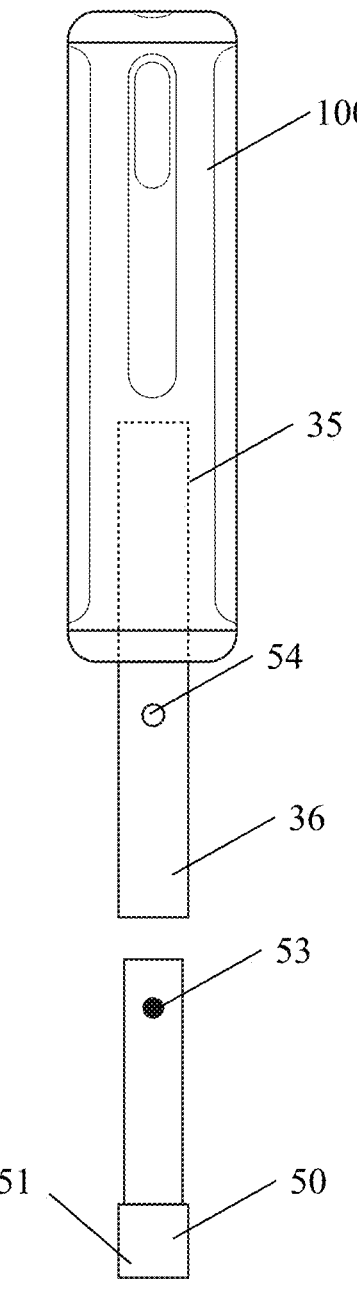
FIG. 10 is a diagrammatic cross-sectional view of a handle in accordance with another embodiment highlighting the coupling of the handle to a pole shaft.

Attachment of a wrist strap 40 (sometimes referred to as a ski pole strap) to the handle 20 in accordance with one embodiment is described with reference to FIG. 8. In the illustrated embodiment, the wrist strap includes a fabric strap 41 and a strap anchor 42. The anchor is configured to slide into strap anchor recess/slot 30 in handle 20. The strap anchor has a preformed fastener hole 43 that aligns with the strap fastener recess 31 in handle 20 when the anchor is positioned in slot 30. Preferably the strap anchor 42 and the slot 30 are sized and shaped so that when the anchor 42 is fully inserted into the slot, the hole 43 fully aligns with the strap fastener recess 31.

To install the wrist strap 40, the strap anchor 42 is inserted into strap anchor slot 30. A strap fastener (which may take the form of a bolt 33), is then inserted into the strap fastener recess 31, through the fastener hole 43 in anchor 42 and screwed into the strap fastener receiver (which may take the place of a nut embedded in the handle core). With this arrangement, the wrist strap 40 can readily be replaced by removing the strap fastener (which frees the wrist strap's anchor), withdrawing the strap/strap anchor from slot 30, and replacing the old strap with a new strap having a similar anchor. Then new strap/strap anchor may then be secured in place in the same manner as the old strap/strap anchor. This makes replacement of the straps very easy. It also contrasts with common strap fastening techniques in which a wood screw or the like is used to secure the strap. In such arrangements, the screw cuts through the strap fabric as it is screwed into the handle—thereby damaging both the strap and the handle itself.

In some embodiments, the nut that serves as the strap fastener receiver is molded into the handle core such that it is exposed on the exterior of the handle core. A plastic overcoat 123 is then overmolded over at least portions of the handle core such that it covers a bottom portion of the strap fastener receiver, but does not cover the strap fastener recess 31, the anchor slot 30, or the pole shaft receiving bore 35. Typically, the overcoat 123 is formed from a softer plastic than the handle core 100 and covers at least a large portion of the grip region 22. The overcoat thus provides a more comfortable grip for the user.

Pole Shaft

In the illustrated embodiment, the handle has a vertically extending bore 35 that opens at the bottom end of the handle core. In some embodiments, the bore 35 is formed during the initial injection or transfer molding of the handle core. When a bottom cap 28 is used, the bottom cap has an opening that exposes the bore 35. During manufacturing, the pole shaft segment 36 is inserted into the bore 35 and secured to the handle core 100. The pole shaft segment can be secured in any desired manner. By way of example, glue or adhesive bonding works well.

In some embodiments, the pole shaft segment 36 constitutes the entire pole shaft 50. In others, it is a smaller fixed pole shaft segment 36 is used and a longer main pole shaft 51 (which can be a single shaft or a multi-segmented shaft) is attached to the handle pole shaft segment 36. In some embodiments, the fixed pole shaft segment only extends a few centimeters or inches beyond the handle, although longer segments may be used. A variety of different attachment structures can be used to secure the pole shaft 51 to the fixed handle segment 36. By way of example, button assemblies work well because they are well suited for handling the relatively large compressive loads that can sometimes be experienced during skiing. In some embodiments, the button assembly may take the form of a spring-action button 53 secured to the main pole shaft that engages a mating hole 54 in the fixed handle segments. In other embodiments, threaded systems can be used, as for example threads on the handle shaft segment that screw into mating threads on the main pole assembly. Of course, other conventional pole segment coupling mechanisms can be used in other embodiments.

The pole shaft 50 and the pole shaft segment may be formed from any suitable material. By way of example, aluminum, carbon fiber and other composite materials commonly used in conventional ski and hiking poles work well.

Many ski and hiking poles have a small metallic tip that is formed from a different (harder) material than the pole shaft. Such tips are typically made from a ferrous magnetic material such as steel. To prevent the pole tips from inadvertently attaching to the magnets, in some embodiments the pole tips 60 are formed from a hard, non-magnetic metal such as stainless steel. Of course, other non-magnetic metals can be used for the pole tips in other embodiments.

Several of the features described above combine to provide the user (or retailers or others) with the ability to easily customize the pole to their personal aesthetic preference or to alter the pole's technical attributes. For example, the use of a pole shaft 50 that releasably attaches to the handle segment 36 allows the user to utilize different color or different length pole shafts with the same handle 20. As will be appreciated by avid skiers, different pole lengths can be desirable for different types of skiing. For example, backcountry skiing often requires longer poles compared to downhill skiing. Cross country ski poles tend to be even longer. Being able to swap out the pole shaft allows the same base magnetic pole system to be used for both without requiring the user to purchase two or more full pairs of magnetic poles.

The described strap anchor and fastener arrangement allows different straps to be utilized with the handle as well—which also can be desirable for both aesthetics and functional reasons.

Similarly, the alignment piece 65 allows different types of baskets to be attached to the poles as desired. Again, as will be appreciated by avid skiers, different baskets are sometimes desirable for different skiing conditions or different types of skiing. Thus again, the described modular systems allow the same magnetic pole system to be optimized for use in a variety of different applications and/or conditions, including using the same poles for hiking if desired.

Although only a few embodiments have been described in detail, it should be appreciated that the invention may be implemented in many other forms without departing from the spirit or scope of the invention. For example, although several magnet geometries and placements have been described, it should be appreciated that more or fewer handle magnets may be provided and that their placement may be widely varied while still accomplishing the desired magnetic coupling. Also, when desired, magnets may be placed on the shaft in addition to, or in place of some of the handle and/or basket magnets. Therefore, the present embodiments should be considered illustrative and not restrictive, and the invention is not to be limited to the details given herein, but may be modified within the scope and equivalents of the appended claims.

What is claimed is:

1. A first ski or hiking pole comprising:
a handle having a grip region, a plastic handle core, an overcoat and a first handle magnet having a first handle magnet magnetic field that emanates laterally from the handle on a first side of the first ski or hiking pole, wherein the overcoat is formed from a softer material than the handle core and forms at least a portion of the grip region of the handle and first handle magnet is position inside of the handle such that the first handle magnet magnetic field passes through the overcoat;
a pole shaft directly or indirectly coupled to or carried by the handle at a first end of the pole shaft; and
a basket coupled to or carried by the pole shaft, the basket including a first basket magnet having a first basket magnet magnetic field that emanates laterally from the basket on the first side of the first ski or hiking pole, and wherein the first handle magnet and the first basket magnet are positioned suitably for magnetically coupling with complementary handle and basket magnets on a second ski or hiking pole to hold the first and second ski or hiking poles together in a side-by-side carrying state suitable for carrying.

2. A pair of ski or hiking poles comprising the first and second ski or hiking poles recited in claim 1, wherein the first and second ski or hiking poles are substantially the same length, whereby in the carrying state the first and second ski or hiking poles are positioned side-by-side such that neither of the first and second ski or hiking poles extends vertically substantially above or below the other with:
the respective baskets of the first and second ski or hiking poles being laterally adjacent one another side-by-side; and
the respective handles of the first and second ski or hiking poles being laterally adjacent one another side-by-side.

3. A first ski or hiking pole as recited in claim 1 further comprising:
a second handle magnet, the first and second handle magnets being (i) longitudinally spaced apart on the handle on opposite longitudinal ends of a grip region of the handle, and (ii) positioned suitably for magnetically interacting with first and second complementary handle magnets on the second ski or hiking pole to provide two spaced apart magnetic couplings on the handle when the first and second ski or hiking poles are held together in the carrying state; and
wherein the overcoat covers all of the handle magnets, and all of the handle magnets are positioned outside of the grip region of the handle.

4. A first ski or hiking pole as recited in claim 3 wherein the first and second handle magnets are positioned on a first side of the handle and the first basket magnet is positioned on a first side of the basket such that the second ski or hiking pole can be magnetically attached to the first ski or hiking pole at both the handle and basket on the first side of the first ski or hiking pole, the first ski or hiking pole further comprising:
third and fourth handle magnets arranged on a second side of the handle; and
a second basket magnet positioned on a second side of the basket and having a second basket magnet magnetic field that emanates laterally from the basket on a second side of the first ski or hiking pole such that the second ski or hiking pole can alternatively be magnetically attached to the first ski or hiking pole at both the handle and basket on a second side of the first ski or hiking pole.

5. A first ski or hiking pole as recited in claim 1 further comprising a second basket magnet having a second basket magnet magnetic field that emanates laterally from the basket on the first side of the first ski or hiking pole, the first and second basket magnets being spaced apart on the basket and positioned suitably for magnetically interacting with first and second complementary basket magnets on the second ski or hiking pole to provide two spaced apart magnetic couplings on the basket when the first and second ski or hiking poles are held together in the carrying state.

6. A first ski or hiking pole as recited in claim 1 wherein the basket has a substantially ovular or racetrack shape having a pair of substantially parallel sides and the first basket magnet magnetic field emanates laterally from the basket from a first one of the parallel sides of the basket.

7. A first ski or hiking pole as recited in claim 1 wherein the handle has a substantially flat handle contact surface adjacent to the first handle magnet and the basket has a substantially flat basket contact surface adjacent to the first basket magnet, wherein the handle contact surface and the basket contact surface are substantially co-planar and arranged such that when the first and second ski or hiking poles are in the carrying state, the handle and basket contact surfaces engage complementary flat handle and basket contact surfaces on the second ski or hiking pole.

8. A first ski or hiking pole as recited in claim 1 wherein the first handle magnet and the first basket magnet are neodymium magnets.

9. A first ski or hiking pole as recited in claim 1 further comprising an accessory mount receiver exposed on a top end of the handle, the accessory mount receiver being molded into the handle core.

10. A first ski or hiking pole as recited in claim 1 further comprising a handle pole segment that is permanently attached to the handle core, an alignment piece attached to the pole shaft, wherein the alignment piece helps facilitate attachment of the basket to the pole shaft in an orientation that aligns the first basket magnet relative to the first handle magnet or a second handle magnet suitably for magnetically coupling with complementary handle and basket magnets on a second ski or hiking pole to hold the first and second ski or hiking poles together in a carrying state suitable for carrying, and wherein:
the pole shaft has a spring action button;
the handle pole segment receives a proximal end of the pole shaft and includes a side hole that receives the spring action button to releasably attach the handle to the pole shaft; and whereby when the pole shaft is bent or otherwise compromised, the pole shaft can readily be replaced with a replacement pole shaft by, (i) detaching the pole shaft from the handle using the spring action button and attaching the replacement pole shaft to the handle using a spring action button on the replacement pole shaft; and (ii) detaching the basket from the alignment piece and attaching the basket to a replacement alignment piece on the replacement pole shaft.

11. A first ski or hiking pole as recited in claim 1 further comprising a wrist strap having a strap anchor, wherein the handle further comprises a strap receiver that receives the strap anchor to facilitate detachable attachment of the wrist strap to the handle.

12. A first ski or hiking pole as recited in claim 1 further comprising a non-magnetic, metallic pole tip attached to a second end of the pole shaft.

13. A first ski or hiking pole as recited in claim 1 wherein the first handle magnet and the first basket magnet are positioned on the first side of the first ski or hiking pole such that the second ski or hiking pole can be magnetically coupled to the first side of the first ski or hiking pole, the first ski or hiking pole further comprising a second handle magnet and a second basket magnet, wherein the second handle magnet and the second basket magnet are positioned on a second side of the first ski or hiking pole that is opposite the first side such that the second ski or hiking pole can alternatively be magnetically coupled to the second side of the first ski or hiking pole, and wherein the second basket magnet has a second basket magnetic field that emanates laterally from the basket on the second side of the first ski or hiking pole.

14. A first ski or hiking pole as recited in claim 1 wherein the overcoat is a plastic overcoat formed from a softer plastic than the handle core.

15. A first ski or hiking pole as recited in claim 1 further comprising a handle pole segment that is permanently attached to the handle core, and wherein:

the pole shaft has a spring action button;

the handle pole segment receives a proximal end of the pole shaft and includes a side hole that receives the spring action button to releasably attach the handle to the pole shaft;

an interface between the pole shaft and the basket constrains the basket to an orientation that aligns the first basket magnet relative to the first handle magnet or a second handle magnet suitably for magnetically coupling with complementary handle and basket magnets on a second ski or hiking pole to hold the first and second ski or hiking poles together in a carrying state suitable for carrying; and when the pole shaft is bent or otherwise compromised, the pole shaft can readily be replaced with a replacement pole shaft by, (i) detaching the pole shaft from the handle using the spring action button and attaching the replacement pole shaft to the handle using a spring action button on the replacement pole shaft; and (ii) detaching the basket from the pole shaft and attaching the basket to a replacement pole shaft.

16. A first ski or hiking pole comprising:

a handle having a grip region and a first handle magnet wherein the first handle magnet is sealed inside the handle;

a pole shaft directly or indirectly coupled to or carried by the handle at a first end of the pole shaft; and a basket coupled to or carried by the pole shaft, the basket including a first basket magnet; and wherein the first handle magnet and the first basket magnet are positioned suitably for magnetically coupling with complementary handle and basket magnets on a second ski or hiking pole to hold the first and second ski or hiking poles together in a carrying state suitable for carrying; and wherein the handle includes a plastic handle core and a top cap that is secured to the handle core to seal the first handle magnet inside the handle.

17. A first ski or hiking pole as recited in claim 16 wherein the top cap is ultrasonically or high frequency welded the handle core to secure the top cap to the handle core and to seal the first handle magnet inside the handle.

18. A first ski or hiking pole comprising:

a handle having a grip region and a first handle magnet having a first handle magnet magnetic field that emanates laterally from the handle on a first side of the first ski or hiking pole;

a pole shaft directly or indirectly coupled to or carried by the handle at a first end of the pole shaft;

a basket coupled to or carried by the pole shaft, the basket including a recess in an upper surface of the basket and a first basket magnet having a first basket magnet magnetic field that emanates laterally from the first side of the first ski or hiking pole, and an alignment piece attached to the pole shaft, wherein the alignment piece helps facilitate attachment of the basket to the pole shaft in an orientation that aligns the basket magnet relative to the handle magnet suitably for magnetically coupling with complementary handle and basket magnets on a second ski or hiking pole to hold the first and second ski or hiking poles together in a carrying state suitable for carrying, the alignment piece including a flange and a shank having an exterior thread, the flange and the basket recess having complementary such that the flange is received in the basket recess to thereby set a vertical position of the basket relative to the pole shaft and an angular orientation of the basket relative to the pole shaft such that the first handle magnet magnetic field and the first basket magnet magnetic field emanate in substantially the same direction for magnetically coupling with complementary handle and basket magnets on a second ski or hiking pole; and a nut that engages the exterior thread of the alignment piece to help indirectly secure the basket to the pole shaft by way of the alignment piece.

19. A first ski or hiking pole as recited in claim 18 wherein:

the handle has a first handle contact surface adjacent the first handle magnet;

the basket has a first basket contact surface adjacent the first basket magnet; and the alignment piece is configured to help ensure that the first handle contact surface is substantially coplanar with the first basket contact surface when the basket is installed on the pole shaft.

20. A first ski or hiking pole as recited in claim 19 wherein the alignment piece is shaped so that the basket can only be secured to the alignment piece to facilitate attachment of the basket in a single orientation.

21. A first ski or hiking pole as recited in claim 18 further comprising:

a second handle magnet having a second handle magnet magnetic field that emanates laterally from a second side of the first ski or hiking pole; and a second basket magnet having a second basket magnet magnetic field that emanates laterally from the basket from the second side of the first ski or hiking pole; and wherein the flange of the alignment piece and the basket recess are shaped so that the basket can be secured to the alignment piece in two, and only two, distinct orientations such that the second ski or hiking pole can alternatively be magnetically attached to the first ski or hiking pole at both the handle and basket on a second side of the first ski or hiking pole.

22. A pair of ski or hiking poles including first and second poles that are substantially the same length and each comprise:

a handle having a grip region, first, second, third and fourth handle magnets each sealed within the handle, a first side surface having substantially coplanar and longitudinally spaced apart first and second handle contact regions, a second side surface having substantially coplanar and longitudinally spaced apart third and fourth handle contact regions, the third and fourth handle contact regions extending substantially parallel to the first and second handle contact regions with the first handle contact region being adjacent the first handle magnet, the second handle contact region being adjacent the second handle magnet, the third handle contact region being adjacent the third handle magnet and the fourth handle contact region being adjacent the fourth handle magnet;

a pole shaft directly or indirectly coupled to or carried by the handle at a first end of the pole shaft;

a metallic non-magnetic pole tip directly or indirectly coupled to or carried by the pole shaft at a second end of the pole shaft; and a basket coupled to or carried by the pole shaft, the basket including first and second basket magnets; and wherein the first and second handle magnets and the first basket magnet each have corresponding magnetic fields that emanate laterally from a first side of the associated ski or hiking pole and the third and fourth handle magnets and the second basket magnet each have corresponding magnetic fields that emanate laterally from a second side of the associated ski or hiking pole opposite the first side of the associated ski or hiking pole;

wherein the first and second handle magnets and the first basket magnet of the first pole are positioned suitably for magnetically coupling with the third and fourth handle magnets and the second basket magnet of the second pole to hold the first and second pole together in a side-by-side first carrying state; and wherein the third and fourth handle magnets and the second basket magnet of the first pole are positioned suitably for magnetically coupling with the first and second handle magnets and the first basket magnet of the second pole to hold the first and second pole together in a side-by-side second carrying state that is distinct from the first carrying state.

23. A pair of ski or hiking poles as recited in claim 22 wherein:

a first magnetic field emanating outward from the first handle magnet through the first contact region has a polarity that is opposite to a third magnetic field emanating outward from the third handle magnet through the third contact region;

a second magnetic field emanating outward from the second handle magnet through the second contact region has a polarity that is opposite to a fourth magnetic field emanating outward from the fourth handle magnet through the fourth contact region; and the magnetic field emanating outward from the first basket magnet is a fifth magnetic field that has a polarity that is opposite to a polarity of the magnetic field emanating outward from the second basket magnet which is a sixth magnetic field.

24. A pair of ski or hiking poles as recited in claim 22 wherein:

each basket has a substantially ovular or racetrack shape having a pair of substantially parallel sides that form first and second basket contact surfaces respectively, the first basket contact surface being substantially coplanar with the first and second handle contact regions and the second basket contact surface being substantially coplanar with the third and fourth handle contact regions; and the first basket magnet is positioned adjacent the first basket contact surface and the second basket magnet is positioned adjacent the second basket contact surface.

25. A pair of ski or hiking poles as recited in claim 22 wherein each handle includes:

a handle body;

a top cap that is ultrasonically or high frequency welded to a top end of the handle body to seal the first and third magnets in the handle; and a bottom cap that is ultrasonically or high frequency welded to a bottom end of the handle body to seal the second and fourth magnets in the handle.

26. A pair of ski or hiking poles as recited in claim 22 wherein:

the first and second handle contact regions are both part of a first substantially planar side surface of the handle; and the third and fourth contact regions are both part of a second substantially planar side surface of the handle.

27. A ski or hiking pole comprising:

a handle having a plastic handle core, an overcoat that extends over at least a portion of the handle core, a grip region, a strap anchor recess, a strap fastener recess and a strap fastener receiver, the strap fastener receiver being embedded in the handle wherein, the overcoat is formed from a softer material than the handle core and forms at least a portion of the grip region of the handle, and wherein the strap fastener receiver is exposed on an exterior surface of the handle core but is covered by the overcoat such that the strap fastener receiver is not exposed on an exterior surface of the handle;

a wrist strap including a strap and a strap anchor, the strap anchor having a preformed fastener receiving hole therein, the strap anchor being sized to be inserted into the strap fastener recess such that the fastener receiving hole aligns with the strap fastener recess;

a strap fastener inserted through the strap fastener recess in the handle and the fastener receiving hole in the wrist strap and detachably coupled to the strap fastener receiver to attach the wrist strap to the handle, wherein the wrist strap may be replaced by removing the fastener, withdrawing the strap anchor from the strap fastener recess, inserting a second strap anchor of a second wrist strap into the strap fastener recess such that a second fastener receiving hole of the second wrist strap aligns with the strap fastener recess, inserting the
fastener through the strap fastener recess and the sec-
ond fastener receiving hole of the second wrist strap,
and securing the fastener to the strap fastener receiver;
and a pole shaft directly or indirectly coupled to or carried by
the handle at a first end of the pole shaft.

28. A ski or hiking pole as recited in claim 27 wherein:
the strap fastener is a bolt having threads thereon;
the strap fastener receiver is threaded; and
the bolt threadably engages the strap fastener receiver.

29. A ski or hiking pole as recited in claim 28 wherein the
strap fastener receiver is a nut formed from a non-magnetic
metal.

30. A ski or hiking pole as recited in claim 27 wherein the
strap is formed from a fabric material and the strap anchor
is formed from a rigid plastic material.

31. A ski or hiking pole as recited in claim 30 wherein the
strap anchor is molded onto the fabric strap.

32. A ski or hiking pole as recited in claim 27 wherein the
strap is formed from a fabric material and the strap anchor
is integrally formed from the fabric material.

33. A ski pole comprising:
a handle including a handle core and a cap secured to an
upper first end of the handle core, the handle having
an accessory attachment receiver molded into the handle
core and exposed at the upper first end of the handle
through an opening in the cap, wherein the accessory
attachment receiver does not extend above a top surface
of the handle core;

a pole shaft directly or indirectly coupled to or carried by
the handle at a second end of the handle; and
a basket coupled to or carried by the pole shaft.

34. A first ski or hiking pole comprising:
a pole shaft having a spring action button;
a handle having a handle core, a grip region and a pole
shaft segment fixedly attached to the handle core that
receives a proximal end of the pole shaft, the pole shaft
segment including a side hole that receives the spring
action button to releasably attach the handle to the pole
shaft;
an alignment piece fixedly and permanently attached to
the pole shaft; and
a basket secured to the alignment piece using a first nut,
wherein the alignment piece ensures that the basket is
arranged in one of (i) a single orientation relative to the
pole shaft, or (ii) one of two permissible orientations
relative to the pole shaft, and
wherein when the pole shaft is bent or otherwise com-
promised, the pole shaft can readily be replaced with a
replacement pole shaft by,
(i) detaching the pole shaft from the handle using the
spring action button and thereafter attaching the
replacement pole shaft to the handle using a spring
action button on the replacement pole shaft; and
(ii) removing the first nut and thereafter detaching the
basket from the alignment piece and thereafter mount-
ing the basket to a replacement alignment piece on the
replacement pole shaft and securing the basket to the
alignment piece using the first nut or a second nut.

* * * * *